United States Patent [19]

Kerr et al.

[11] Patent Number: 5,771,059
[45] Date of Patent: Jun. 23, 1998

[54] APPARATUS FOR PREVENTING AXIAL MOVEMENT OF A LEAD SCREW

[75] Inventors: Roger S. Kerr, Brockport; Svetlana Reznik, Rochester; Edward P. Furlani, Lancaster, all of N.Y.

[73] Assignee: Eastman Kodak Company, Rochester, N.Y.

[21] Appl. No.: 621,417

[22] Filed: Mar. 25, 1996

[51] Int. Cl.⁶ ............................... B41J 2/47; B41J 2/435; G01D 15/16; G01D 15/18
[52] U.S. Cl. ........................................ 347/234; 346/139 D
[58] Field of Search ............................ 347/234, 37, 232; 318/646; 346/139 D; 400/322, 323, 317.1, 320

[56] References Cited

U.S. PATENT DOCUMENTS

| | | |
|---|---|---|
| 5,036,266 | 7/1991 | Burke .................................... 318/646 |
| 5,260,714 | 11/1993 | Decook et al. . |
| 5,264,867 | 11/1993 | DeCook et al. . |
| 5,270,731 | 12/1993 | Kerr et al. . |
| 5,276,464 | 1/1994 | Kerr et al. . |
| 5,278,579 | 1/1994 | Kerr et al. . |
| 5,300,957 | 4/1994 | Burke .................................... 347/41 |
| 5,301,099 | 4/1994 | Kerr . |

*Primary Examiner*—N. Le
*Assistant Examiner*—Thinh Nguyen
*Attorney, Agent, or Firm*—Peyton C. Watkins

[57] ABSTRACT

A lathe bed scanner having a lead screw that is substantially prevented from axial movement, the scanner comprises a first magnet integrally attached to the lead screw. A second magnet disposed opposite said first magnet for attracting the first magnet, which attraction permits the first magnet to prevent axial movement of the lead screw. A ball bearing disposed between both the first magnet and the second magnet for permitting the lead screw to rotate while maintaining the prevention of axial movement.

18 Claims, 4 Drawing Sheets

APPARATUS FOR PREVENTING AXIAL MOVEMENT OF A LEAD SCREW

FIELD OF THE INVENTION

The invention relates generally to the field of a lathe bed scanner utilizing a rotating lead screw for moving a write head assembly and, more particularly, to such lead screws having an improved apparatus for preventing axial movement of the lead screw.

BACKGROUND OF THE INVENTION

Color-proofing is the procedure used by the printing industry for creating representative images that replicate the appearance of printed images without the cost and time required to actually set up a high-speed, high-volume printing press to print an example of the images intended. One such color proofer is a lathe bed scanner which utilizes a thermal printer having half-tone capabilities. This printer is arranged to form an image on a thermal print medium, or writing element, in which a donor transfers a dye to the thermal print medium upon a sufficient amount of thermal energy. This printer includes a plurality of diode lasers which can be individually modulated to supply energy to selected areas of the medium in accordance with an information signal. The print-head of the printer includes one end of a fiber optic array having a plurality of optical fibers coupled to the diode lasers. The thermal print medium is supported on a rotatable imaging drum, and the print-head with the fiber optic array is movable relative to the longitudinal axis of the drum. The dye is transferred to the thermal print medium as the radiation, transferred from the diode lasers to the donor element by the optical fibers, is converted to thermal energy in the donor element.

For permitting relative movement of the print-head, the print-head is placed on a rotatable lead screw having a threaded shaft. The lead screw rests between two sides of the frame of the scanner where it is supported on both ends by bearings. At the drive end, the lead screw continues through the bearing, through a pair of spring retainers that are separated and loaded by a compression spring and to a drive motor. The drive motor induces rotation to the screw, and the compression spring functions to limit axial movement of the lead screw.

The print-head is attached to the threaded shaft of the lead screw by a drive nut which is configured to move the print-head along the threaded shaft as the lead screw is rotated by the drive motor. The lateral movement of the print-head is controlled by switching the direction of the rotation of the lead screw.

Although the presently known and utilized scanner is satisfactory, it is not without shortcomings. The spring that limits the axial movement of the lead screw should obviously be calibrated, and should also by replaced periodically due to mechanical aging. This is obviously labor intensive, time consuming and expensive.

Consequently, a need exists for improvements in the construction of the lathe bed scanner so as to overcome the above-described shortcomings.

SUMMARY OF THE INVENTION

The present invention is directed to overcoming one or more of the problems set forth above. Briefly summarized, according to one aspect of the present invention, the invention resides in a lathe bed scanner having a lead screw that is substantially prevented from axial movement, the scanner comprising (a) a first magnet integrally attached to said lead screw; (b) means for attracting said first magnet disposed opposite said first magnet which attraction permits said first magnet to prevent axial movement of said lead screw; and (c) a ball bearing disposed between both said first magnet and said attracting means for permitting said lead screw to rotate while maintaining the prevention of axial movement.

It is an object of the present invention to overcome the above-described drawbacks.

It is an advantage of the present invention to provide a cost-efficient device for implementing the present invention.

It is a feature of the present invention to provide a ball bearing disposed between a pair of magnets for permitting the lead screw to rotate while maintaining the prevention of axial movement.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

Figure 1:
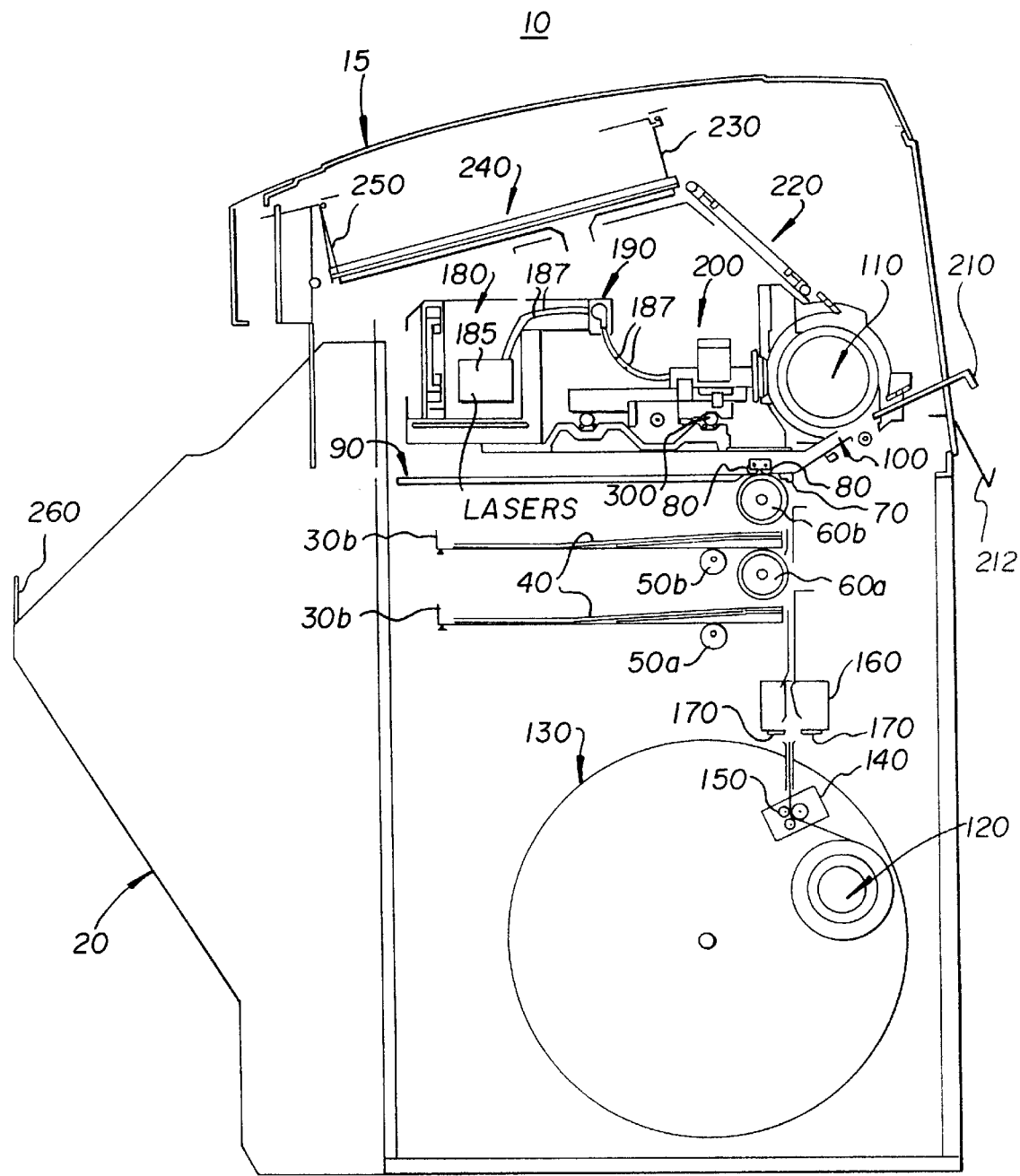
FIG. 1 is a side view in vertical cross section of a lathe bed scanner of the present invention.

Referring to FIG. 1, there is illustrated a lathe bed scanner 10 of the present invention having a housing 15 for forming a protective cover. A movable, hinged door 20 is attached to a front portion of the housing 15 for permitting access to two media trays, a lower tray 30a and upper tray 30b, that are positioned in an interior portion of the housing 15 for supporting receiver material 40, typically paper, thereon. It is obvious to those skilled in the art that only one media tray 30 will dispense receiver material 40 out of its paper tray 30 for creating an image thereon; the alternate media tray 30 either holds an alternative type of paper or functions as backup. In this regard, the lower media tray 30a includes a cam 50a for lifting the paper 40 upwardly toward a rotatable, lower media roller 60a and, ultimately, toward a second rotatable, upper media roller 60b which, when both are rotated, permits the receiver material 40 to be pulled upwardly towards a media guide 70. The upper media tray 30b also includes a cam 50b for lifting the receiver material 40 toward the upper media roller 60b which directs it towards the media guide 70.

As illustrated by the phantom position, the movable media guide 70 directs the receiver material 40 under a pair of rollers 80 which engages the receiver material 40 for assisting the upper media roller 60b in directing it onto a staging tray 90. The media guide 70 is attached and hinged to the interior of the housing 15 at one end, and is uninhibited at its other end for permitting multiple positioning of the media guide 70. The media guide 70 then rotates its uninhibited end downwardly, as illustrated by the solid line, and the direction of rotation of the upper media roller 60b is reversed for forcing the receiver material 40 resting on the staging tray 90 back under the rollers 80, upwardly through an entrance passageway 100 and around a rotatable imaging drum 110.

Four rolls of donor material 120 (only one is shown) are connected to a carousel 130 in a lower portion of the housing 15, and each roll 120 includes a donor material 120 of a different color, typically black, yellow, magenta and cyan. These donor materials are ultimately cut into sheets and passed to the imaging drum for forming a medium from which dyes imbedded therein are passed to the receiver material resting thereon, which process is described in detail herein below. In this regard, a drive mechanism 140 is attached to each roll 120, and includes three rollers 150 through which the donor material 120 of interest is rolled upwardly into a knife assembly 160. After the donor material 120 reaches a predetermined position, the rollers 150 cease driving the donor material 120 and two blades 170 positioned at the bottom portion of the knife assemble cut the donor material 120 into a sheet. The media rollers 60a and 60b and media guide 70 then pass the donor material 120 onto the drum 110 and in registration with the receiver material 40 using the same process as described above for passing the receiver material 40 onto the drum 110. The donor material 120 rests atop the receiver material 40 with a narrow gap between the two created by microbeads imbedded into the receiver material 40.

A laser assembly 180 includes twenty lasers 185 in its interior, and these lasers are connected via fiber optic cables 187 to a coupling head 190 and ultimately to a write head 200. The write head 200 creates thermal energy from the signal received from the lasers 185 causing the donor material 120 to pass its dye across the gap to the receiver material 40. The write head 200 is attached to a lead screw 210 via a nut (not shown in FIG. 1) for permitting it to move axially along the longitudinal axis of the drum 110 for writing data onto the receiver material 40.

For writing, the drum 110 rotates at a constant velocity, and the write head 200 begins at one end of the receiver material 40 and traverses the entire length of the receiver material 40 for completing the transfer process for the particular donor material resting on the receiver material 40. After the donor material 120 has completed its dye transfer, the donor material 120 is then transferred from the drum 110 and out of the housing 15 via a skive or ejection chute 210. The donor material eventually comes to rest on a donor material tray 212 for permitting removal by a user. The above-described process is then repeated for the other three rolls of donor material.

After all four sheets of donor material have transferred their dyes, the receiver material 40 is transported via a transport mechanism 220 through an entrance door 230 and into a dye binding assembly 240 where it rests against an exit door 250. The entrance door 230 is opened for permitting the receiver material 40 to enter into the dye binding assembly 240, and shuts once it comes to rest in the dye binding assembly 240. The dye binding assembly 240 heats the receiver material 40 for further binding the transferred dye on the receiver material 40 and for sealing the microbeads thereon. After heating, the exit door 250 is opened and the receiver material 40 with the image thereon passes out of the housing 15 and comes to rest against a stop 260.

Figure 2:
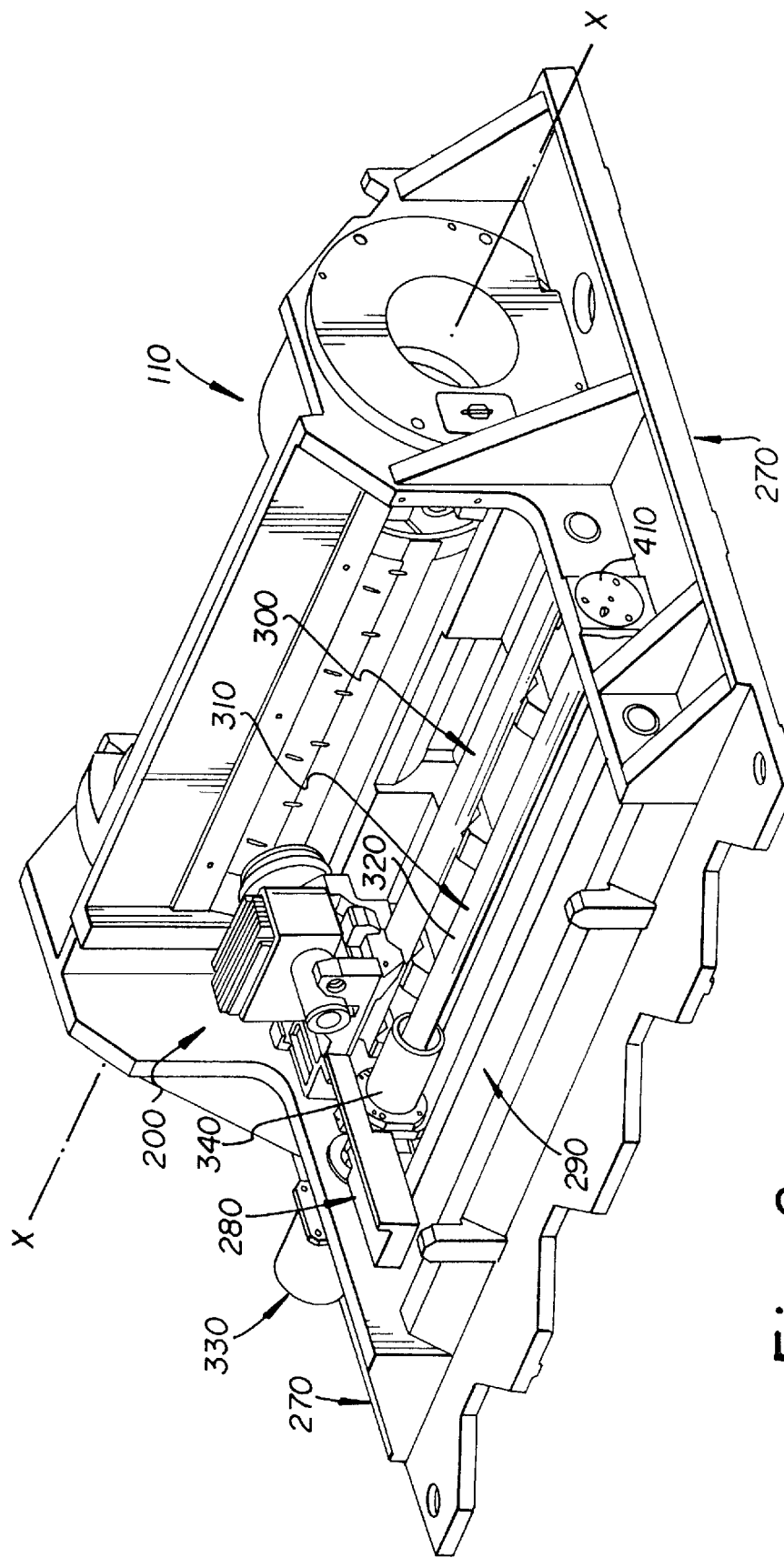
FIG. 2 is a perspective view of an imaging drum, laser writer and lead screw of the present invention.

Referring to FIG. 2, there is illustrated a perspective view of the imaging drum 110 and write head 200 of the lathe bed scanner 10. The imaging drum 110 is mounted for rotation about an axis (x) in a frame support 270. The write head 200 is movable with respect to the imaging drum 110, and is arranged to direct a beam of actinic light to the donor material 120 (shown in FIG. 1). The write head 200 contains therein a plurality of writing elements (not shown) which can be individually modulated by electronic signals from the laser diodes 185, which signals are representative of the shape and color of the original image, so that each dye is heated to cause volatilization only in those areas in which its presence is required on the receiver material 40 to reconstruct the color of the original object.

The write head 200 is mounted on a movable translator member 280 which, in turn, is supported for low friction slidable movement on bars 290 and 300. The bars 290 and 300 are sufficiently rigid so that they do not sag or distort between the mounting points at their ends and are arranged as parallel as possible with the axis (x) of the imaging drum 110. The upper bar 300 is arranged to locate the axis of the writing head 200 precisely on the axis (x) of the drum 110 with the axis of the writing head perpendicular to the drum axis (x). The upper bar 300 locates the translator member 280 in the vertical and the horizontal directions with respect to the axis of the drum 110. The lower bar 290 locates the translator member 280 only with respect to rotation of the translator about the bar 290 so that there is no over-constraint of the translator member 280 which might cause it to bind, chatter, or otherwise impart undesirable vibration to the writing head 200 during the generation of an image.

Figure 3:
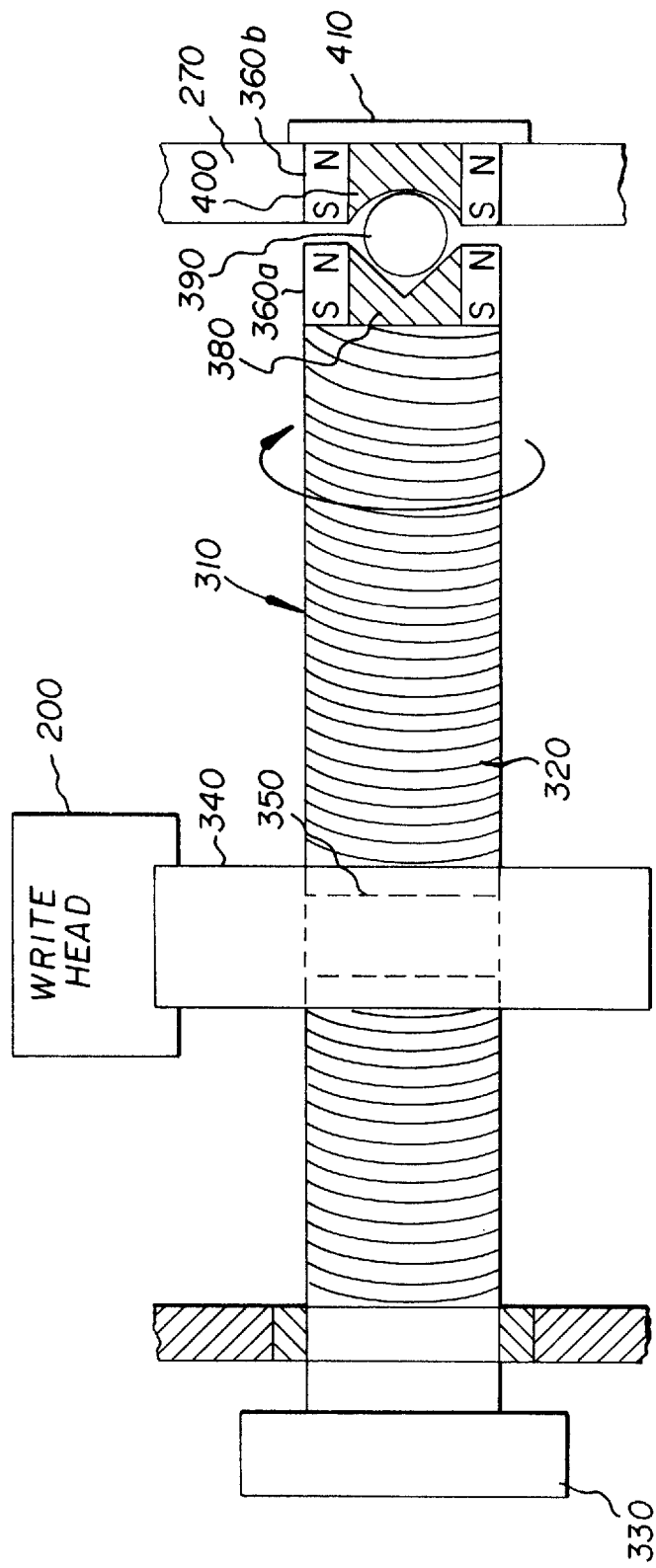
FIG. 3 is a top view in horizontal cross section of the lead screw.

Referring to FIGS. 2 and 3, a lead screw 310 includes an elongated, threaded shaft 320 which is attached to a motor 330 on its drive end and to the frame support 270 at its driven end. A nut 340 includes grooves in its hollowed-out center portion 350 for mating with the threads of the shaft 320 for permitting the nut 340 to move axially along the shaft 320 as the nut 340 is rotated. The nut 340 is integrally attached to the write head 200 at its periphery so that as the shaft 320 is rotated by the motor 330 the nut 340 moves axially along the shaft 320 which, in turn, moves the writing head 200 axially along the drum 110.

As best illustrated in FIG. 3, an annular-shaped magnet 360a is integrally attached to the driven end of the shaft 320, and is in a spaced-apart relationship with another annular-shaped magnet 360b permanently attached to the frame support 270. The magnets 360 are preferably made of rare-earth materials such as neodymium-iron-boron. A generally circular-shaped insert 380 rests in an interior hollowed-out portion of the magnet 360a, and includes a generally V-shaped surface at one end for receiving a ball bearing 390 and a flat surface at its other end for abuttingly attaching to one end of the shaft 320. Another circular-shaped insert 400 is placed in the other magnet 360b, and includes an arcuate-shaped surface on one end for receiving the ball bearing 390, and a flat surface at its other end for receiving an end cap 410 placed over the magnet 360b and attached to the frame support 270 for protectively covering the magnet 360b. Both inserts 380 and 400 are preferably made of materials such as Rulon J or Delrin AF, both well known in the art.

The lead screw operates as follows. The motor 330 is energized and imparts rotation to the lead screw 310, as indicated by the arrows, causing the nut to move axially along the shaft. The magnets 360 are magnetically attracted to each other which prevents axial movement of the lead screw 310. The ball bearing 390, however, permits rotation by maintaining the positional relationship of the magnets 360, i.e., slightly spaced apart, which prevents mechanical friction between them while obviously permitting the shaft 320 to rotate.

Figure 4A:
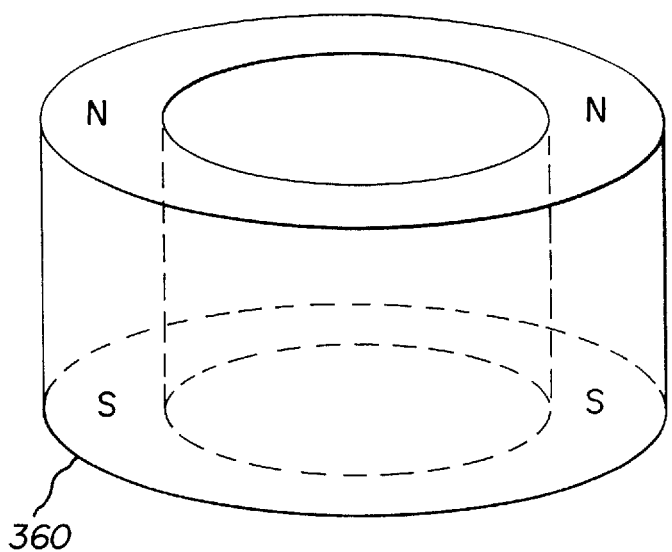
FIGS. 4A and 4B are perspective views of magnets of the present invention.
Figure 4B:
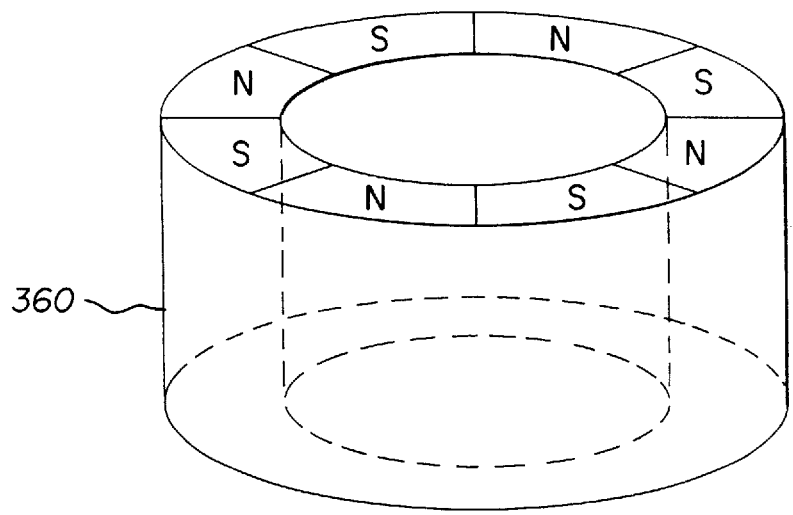

Referring to FIGS. 4A and 4B, it is instructive to note the magnets 360 may both be bipolar as illustrated in FIG. 4A or both have a plurality of poles as illustrated in FIG. 4B. It is obvious to those skilled in the art that, regardless of the number of poles, the poles which are directly opposite each other should be of the opposite polarity for attracting each other.

Figure 5:
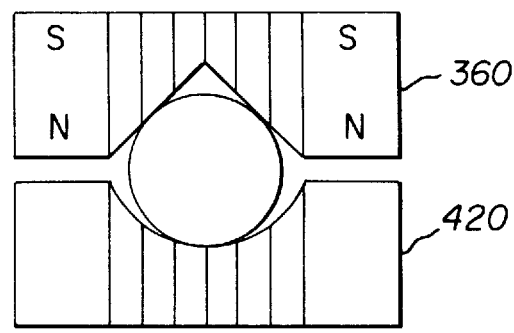
FIG. 5 is an alternative embodiment of the magnets of FIGS. 4A and 4B.

Referring to FIG. 5, in an alternative embodiment, either magnet 360 may be substituted with a ferromagnetic member, such as an iron block 420, while maintaining a magnet 360 opposite it for attracting the magnet 360. The magnet 360 opposite the ferromagnetic member 420 can still either be bi-polar or have a plurality of poles as illustrated in FIG. 4B.

The invention has been described with reference to a preferred embodiment. However, it will be appreciated that variations and modifications can be effected by a person of ordinary skill in the art without departing from the scope of the invention.

Parts List:

10 scanner
15 housing
20 door
30 media tray
40 receiver material
50 cams
60 media rollers
70 media guide
80 rollers
90 staging tray
100 entrance passageway
110 imaging drum
120 rolls of donor material
130 carousel
140 drive mechanism
150 rollers
160 knife assembly
170 blades
180 laser assembly
185 lasers
187 optic cables
190 coupling head
200 write head
210 donor material ejection chute
212 donor ejection tray
220 transport mechanism
230 entrance door
240 dye binding assembly
250 exit door
260 stop
270 frame support
280 translator member
290 bars
300 bars
310 lead screw
320 threaded shaft
330 motor
340 nut
350 center portion
360 magnets
380 insert
390 ball bearing
400 insert
410 end cap
420 ferromagnetic block

We claim:

1. A scanner having a lead screw that is substantially prevented from axial movement, the scanner comprising:
   (a) first means for attracting integrally attached to said lead screw;
   (b) second means for attracting said first means disposed opposite said first magnet, said second attracting means having attraction which permits said first attracting means to prevent axial movement of said lead screw; and
   (c) a bearing disposed between both said first attracting means and said second attracting means for permitting said lead screw to rotate while maintaining the prevention of axial movement.

2. The scanner as in claim 1, wherein said first attracting means is a first magnet.

3. The scanner as in claim 1, wherein said first attracting means is a ferromagnetic member.

4. The scanner as in claim 1 further comprising a first receiving member disposed in said first attracting means and a second receiving member disposed in said second attracting means both for receiving said bearing.

5. The scanner as in claim 4 further comprising a motor attached to said lead screw for providing rotation to said lead screw.

6. The scanner as in claim 2, wherein said second attracting means is a second magnet.

7. The scanner as in claim 2, wherein said second attracting means is a ferromagnetic member.

8. The scanner as in claim 3, wherein said second attracting means is a magnet.

9. The scanner as in claim 3, wherein said second attracting means is a ferromagnetic member.

10. An apparatus for preventing axial movement of a rotating rod, the apparatus comprising:
    (a) first and second members magnetically attracted to each other, and disposed opposite each other in a spaced apart relationship; said first member is integrally attached to said lead screw so that the magnetic attraction prevents axial movement of said rod; and
    (b) a bearing disposed between said first and second member for permitting said rod to rotate while maintaining the prevention of axial movement.

11. The apparatus as in claim 10, wherein said first member is a magnet.

12. The apparatus as in claim 11, wherein said second member is a ferromagnetic member.

13. The apparatus as in claim 11, wherein said second member is a magnet.

14. The apparatus as in claim 10, wherein said second member is a magnet.

15. The apparatus as in claim 14, wherein said first member is a ferromagnetic member.

16. The apparatus as in claim 14, wherein said first member is a magnet.

17. The apparatus as in claim 10 further comprising a first receiving member disposed in said first member and a second receiving member disposed in said second member both for receiving said ball bearing.

18. The apparatus as in claim 17 further comprising a motor for rotating said rod.

* * * * *